(12) United States Patent
Miyazaki et al.

(10) Patent No.: US 11,162,463 B2
(45) Date of Patent: Nov. 2, 2021

(54) STRUCTURE FOR SUCTIONING BACK BLOW-BACK FUEL

(71) Applicant: Kawasaki Jukogyo Kabushiki Kaisha, Kobe (JP)

(72) Inventors: Hideshi Miyazaki, Akashi (JP); Kazuhiko Takemoto, Kakogawa (JP)

(73) Assignee: KAWASAKI JUKOGYO KABUSHIKI KAISHA

( * ) Notice: Subject to any disclaimer, the term of this patent is extended or adjusted under 35 U.S.C. 154(b) by 67 days.

(21) Appl. No.: 16/679,619

(22) Filed: Nov. 11, 2019

(65) Prior Publication Data

US 2020/0072171 A1 Mar. 5, 2020

Related U.S. Application Data

(63) Continuation of application No. PCT/JP2018/023288, filed on Jun. 19, 2018.

(30) Foreign Application Priority Data

Jul. 12, 2017 (JP) .............................. JP2017-136210

(51) Int. Cl.
*F02M 35/10* (2006.01)
*B01D 46/00* (2006.01)
(Continued)

(52) U.S. Cl.
CPC ... *F02M 35/10281* (2013.01); *B01D 46/0005* (2013.01); *B01D 46/0027* (2013.01);
(Continued)

(58) Field of Classification Search
CPC ............. F02M 35/10281; F02M 17/34; F02M 35/0201; F02M 35/024; F02M 35/10262;
(Continued)

(56) References Cited

U.S. PATENT DOCUMENTS 1,506,229 A * 8/1924 Ensign ...................... F02M 1/16
261/18.2
2,100,205 A * 11/1937 Spohr ....................... F02M 1/00
261/34.2
(Continued)

FOREIGN PATENT DOCUMENTS

EP 2927470 10/2015
JP 38-021007UB 10/1963
(Continued)

*Primary Examiner* — Phutthiwat Wongwian
*Assistant Examiner* — Susan E Scharpf (57) ABSTRACT

A first fuel storage portion is disposed on the upstream side of a fuel supply device of an engine so as to be contiguous with an air-intake passage of the fuel supply device. A blow-back suppression plate for suppressing blow-back from the air-intake passage is disposed between a filter element and the first fuel storage portion of an air cleaner. A suction-back passage is formed such that fuel accumulated in a fuel accumulation portion in the air cleaner is suctioned back through the suction-back passage into the air-intake passage. The suction-back passage allows communication between the fuel accumulation portion in the air cleaner and a suction-back port formed at the downstream-side end of the first fuel storage portion.

8 Claims, 6 Drawing Sheets

(51) Int. Cl.
  *F02B 63/02*    (2006.01)
  *F02M 17/34*    (2006.01)
  *F02M 35/02*    (2006.01)
  *F02M 35/024*   (2006.01)

(52) U.S. Cl.
  CPC .............. *F02B 63/02* (2013.01); *F02M 17/34* (2013.01); *F02M 35/0201* (2013.01); *F02M 35/024* (2013.01); *F02M 35/10262* (2013.01); *F02M 35/10275* (2013.01); *B01D 2279/60* (2013.01)

(58) Field of Classification Search
  CPC .......... F02M 35/10275; B01D 46/0005; B01D 46/0027; B01D 2279/60; F02B 63/02
  See application file for complete search history.

(56) References Cited

U.S. PATENT DOCUMENTS

| | | | | |
|---|---|---|---|---|
| 3,618,578 A * | 11/1971 | Swatman | ............ | F02M 25/089 123/519 |
| 3,903,695 A * | 9/1975 | Nakada | ............ | F01N 3/227 60/290 |
| 4,438,743 A * | 3/1984 | Namba | ............ | F02M 35/108 123/308 |
| 4,447,370 A * | 5/1984 | Kobayashi | ............ | F02M 1/16 261/121.3 |
| 4,475,510 A * | 10/1984 | Asaka | ............ | F02B 29/00 123/432 |
| 4,773,365 A * | 9/1988 | Nagashima | ............ | F02B 63/02 123/195 C |
| 4,819,589 A * | 4/1989 | Nagashima | ............ | F02B 63/02 123/184.23 |
| 6,647,940 B2 * | 11/2003 | Wada | ............ | F02B 61/045 123/184.21 |
| 6,655,335 B2 * | 12/2003 | Imafuku | ............ | F02B 63/02 123/179.18 |
| 6,810,861 B2 * | 11/2004 | Itakura | ............ | F02M 25/089 123/516 |
| 9,453,467 B2 * | 9/2016 | Taniguchi | ............ | F02D 11/02 |
| 2001/0011531 A1 * | 8/2001 | Uenoyama | ............ | F02M 23/03 123/65 R |
| 2003/0226553 A1 * | 12/2003 | Yasui | ............ | F02M 35/10222 123/573 |
| 2008/0120951 A1 * | 5/2008 | Sato | ............ | F02M 35/108 55/418 |
| 2009/0007531 A1 * | 1/2009 | Haussner | ............ | F02M 17/04 55/495 |
| 2009/0050094 A1 * | 2/2009 | Sano | ............ | F02D 9/103 123/184.21 |
| 2009/0283079 A1 * | 11/2009 | Tsunoda | ............ | F02M 35/108 123/65 PD |
| 2010/0126466 A1 * | 5/2010 | Ikutame | ............ | F02M 7/24 123/438 |
| 2012/0174889 A1 * | 7/2012 | Shirai | ............ | F02M 35/024 123/198 E |
| 2013/0098325 A1 * | 4/2013 | Fukushima | ............ | F02M 35/0207 123/184.23 |
| 2015/0285197 A1 * | 10/2015 | Mutoh | ............ | F02M 35/10078 123/184.21 |

FOREIGN PATENT DOCUMENTS

| | | |
|---|---|---|
| JP | 63-075559UA | 5/1988 |
| JP | 3717884 B | 9/2005 |
| JP | 2013-530330 A | 7/2013 |
| JP | 2017-101606 A | 6/2017 |
| WO | WO2012/001731 A1 | 1/2012 |
| WO | WO2012/001751 A1 | 1/2012 |

\* cited by examiner

STRUCTURE FOR SUCTIONING BACK BLOW-BACK FUEL

CROSS REFERENCE TO THE RELATED APPLICATION

This application is a continuation application, under 35 U.S.C. § 111(a) of international patent application No. PCT/JP2018/023288, filed Jun. 19, 2018, which claims priority to Japanese patent application No. 2017-136210, filed Jul. 12, 2017, the entire disclosure of which is herein incorporated by reference as a part of this application.

BACKGROUND OF THE INVENTION

Field of the Invention

The present invention relates to a structure, for suctioning back blow-back fuel, for small-sized engines used in small-sized power-driven machines such as brush cutters and chain saws.

Description of Related Art

In small-sized engines (gasoline engine) used in small-sized power-driven machines such as brush cutters, an air cleaner is connected to an upstream-side portion of a fuel supply device such as a carburetor, and air is introduced to the fuel supply device via the air cleaner owing to intake negative pressure generated by strokes of a piston. While passing through the fuel supply device, the air (intake air) is sprayed with fuel, thereby generating air-fuel mixture. The air-fuel mixture is supplied to a combustion chamber (for example, Patent Document 1).

RELATED DOCUMENT

Patent Document

[Patent Document 1] JP Patent No. 3717884
[Patent Document 2] JP Examined Utility Model Publication No. 38-021007
[Patent Document 3] JP Laid-open Utility Model Publication No. 63-075559
[Patent Document 4] JP Laid-open Patent Publication No. 2017-101606

Since such intake air pulsates owing to fluctuations in the pressure of air from air-intake port of a cylinder, the intake air may blow back through an air-intake passage into the air cleaner at the time of high-speed operation or the like. If the amount of the intake air having blown back increases, an element of the air cleaner may be clogged with fuel or lubricating oil in the intake air.

In Patent Document 1, a blow-back prevention plate is provided so as to be integrated with a cleaner case, thereby preventing blow-back from an air-intake passage. Blow-back fuel received by the blow-back prevention plate is suctioned back into the air-intake passage by intake negative pressure. However, the structure in Patent Document 1 has the following drawback. Since the blow-back fuel assumes the form of mist, it is difficult to completely receive the blow-back fuel. Therefore, a portion of the blow-back fuel is scattered in the cleaner case and adhered to the wall of the cleaner case. Then, the fuel having been adhered to the wall of the cleaner case is liquefied and left in the case.

In Patent Documents 2 and 3, liquefied fuel is accumulated in a bottom portion of a cleaner case and is suctioned back into the air-intake passage using a pipe. However, the structures in Patent Documents 2 and 3 have the following drawbacks. Since a suction-back passage is formed by the pipe, the passage is rendered to be long, and thus the passage resistance or pipe friction loss increases, and the force of suctioning back the fuel decreases. In addition, a pipe, a coupler, a holder, and the like are necessary, whereby the number of components increases.

In Patent Document 4, a blow-back guiding member for receiving blow-back fuel and guiding the blow-back fuel to a bottom portion of a cleaner case is provided, and the blow-back fuel guided by the blow-back guiding member is accumulated in a fuel accumulation part at the bottom portion of the cleaner case. The fuel in the fuel accumulation part is returned into an air-intake passage through a return passage which is formed so as to be integrated with the cleaner case. The return passage is opened at one side thereof so as to have a slit-like shape. Fuel in the fuel accumulation part is returned through the return passage into the air-intake passage owing to negative pressure generated by suction and the surface tension in the return passage. However, the structure in Patent Document 4 has the following drawback. Since blow-back fuel is completely received by the blow-back guiding member and accumulated in the fuel accumulation part, the amount of the fuel in the fuel accumulation part becomes large, and thus, it is difficult to completely return the blow-back fuel from the return passage into the air-intake passage.

SUMMARY OF THE INVENTION

An object of the present invention is to provide a structure for suctioning back blow-back fuel, the structure enabling suppression of blow-back from an air-intake passage and enabling blow-back fuel to be effectively suctioned back into the air-intake passage.

In order to achieve the above-described object, a structure for suctioning back blow-back fuel according to the present invention includes: a first fuel storage portion disposed on an upstream side of a fuel supply device of an engine and contiguous with an air-intake passage of the fuel supply device; a suction-back passage through which fuel accumulated in an air cleaner is suctioned back into the air-intake passage; and a blow-back suppression plate disposed between a filter element of the air cleaner and the first fuel storage portion and configured to suppress blow-back from the air-intake passage. The suction-back passage allows communication between a fuel accumulation portion in the air cleaner and a suction-back port formed in the first fuel storage portion.

In this configuration, blow-back fuel from the air-intake passage is received by the blow-back suppression plate. Accordingly, blow-back of fuel from the air-intake passage is suppressed. A portion of the blow-back fuel received by the blow-back suppression plate is accumulated in the first fuel storage portion. The fuel accumulated in the first fuel storage portion is directly returned into the air-intake passage contiguous with the first fuel storage portion owing to negative pressure generated by suction. In addition, the remaining portion of the blow-back fuel is liquefied in the air cleaner and is accumulated in a bottom portion of the air cleaner. The fuel accumulated in the bottom portion of the air cleaner is suctioned back from the suction-back port into the air-intake passage owing to the suction effect of the flow of intake air. If the suction-back port is formed in a downstream-side portion of the first fuel storage portion, the suction effect is particularly favorably obtained. As described above, this configuration enables the blow-back suppression plate to suppress blow-back of fuel from the air-intake passage, and enables fuel to be effectively suctioned back from the first fuel storage portion and the suction-back port into the air-intake passage owing to the suction effect of the flow of intake air.

In the present invention, a blow-back prevention piece, opposed to an inlet of the air-intake passage and configured to prevent blow-back from the air-intake passage, may be formed at an upstream-side end of the first fuel storage portion. In this configuration, the blow-back prevention piece can further suppress the blow-back of fuel from the air-intake passage.

In the present invention, the air cleaner may include a cleaner case connected to the fuel supply device, and a cleaner cap covering the cleaner case and the filter element. The suction-back passage may be surrounded by: the cleaner case; a pair of projecting walls formed so as to be integrated with the cleaner case; and a closing member which is in contact with tip ends of the pair of projecting walls. In this configuration, the suction-back passage which is a passage having a closed outer periphery can be easily formed by the cleaner case, the pair of projecting walls, and the closing member. Since the suction-back passage is formed so as to have a closed outer periphery, suction force generated by intake negative pressure can be effectively made use of. In this case, the closing member may be formed by the blow-back suppression plate attached to the cleaner case. In this configuration, it is not necessary to separately prepare any closing member, whereby the number of components can be prevented from increasing.

In the case where the suction-back passage is surrounded by the cleaner case, the pair of projecting walls, and the blow-back suppression plate, an area of the suction-back port may be set to be sufficiently smaller than a cross-sectional area of the suction-back passage such that a suction effect due to intake air flowing in the air-intake passage is exerted. In this configuration, since the exit of the suction-back passage is narrowed by forming the suction-back port as the exit, the suction effect due to intake negative pressure can be effectively made used of.

In the present invention, the blow-back suppression plate may include: a blow-back suppression portion configured to suppress the blow-back; and an air-intake passage portion through which intake air is allowed pass, in which case the blow-back suppression plate may be configured to cover the inlet of the air-intake passage and be detachably fastened to the cleaner case. In this configuration, since the blow-back suppression plate can be detached, the inside of the air cleaner can be easily cleaned.

In the present invention, the fuel accumulation portion may be formed at a lower part in the cleaner case so as to be located between the cleaner case and the blow-back suppression plate, and an inlet of the suction-back passage may be formed in the fuel accumulation portion. In this configuration, since the fuel accumulation portion is formed in such a narrow space, fuel in the fuel accumulation portion can be smoothly suctioned back into the air-intake passage.

In the present invention, the first fuel storage portion may project upstream from the inlet, of the air-intake passage, which is formed in the cleaner case, a second fuel storage portion may be formed on the cleaner case so as to extend along a part of a peripheral edge of the inlet of the air-intake passage, and the second fuel storage portion may be contiguous with a side edge, of the first fuel storage portion, that extends along a direction of a flow of intake air. In this configuration, since the second fuel storage portion is provided, blow-back fuel can be stored even when the orientation of the engine is changed. The blow-back fuel having been thus stored can be suctioned back into the air-intake passage by the suction effect due to intake air.

In the present invention, the fuel supply device may be a carburetor, the carburetor may include an air path and an air-fuel mixture path, and the suction-back port may communicate with the air-fuel mixture path. With this configuration, the structure for suctioning back blow-back fuel according to the present invention is applicable to two-cycle engines having a scavenging structure of an air leading type.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, a preferred embodiment of the present invention will be described with reference to the drawings. In the present specification, a "front-rear direction" refers to the axial direction of a crankshaft of an engine, an "up-down direction" or "vertical direction" refers to the axial direction of a cylinder bore, and a "left-right direction" or "widthwise direction" refers to a direction that is orthogonal to both the front-rear direction and the up-down direction. In addition, an "upstream side" and a "downstream side" refer to the upstream side and the downstream side in the direction of the flow of intake air. In the following embodiment, a small-sized two-cycle engine used in a brush cutter is described as an example. However, the present invention is applicable to other small-sized power-driven machines such as chain saws.

Figure 1:
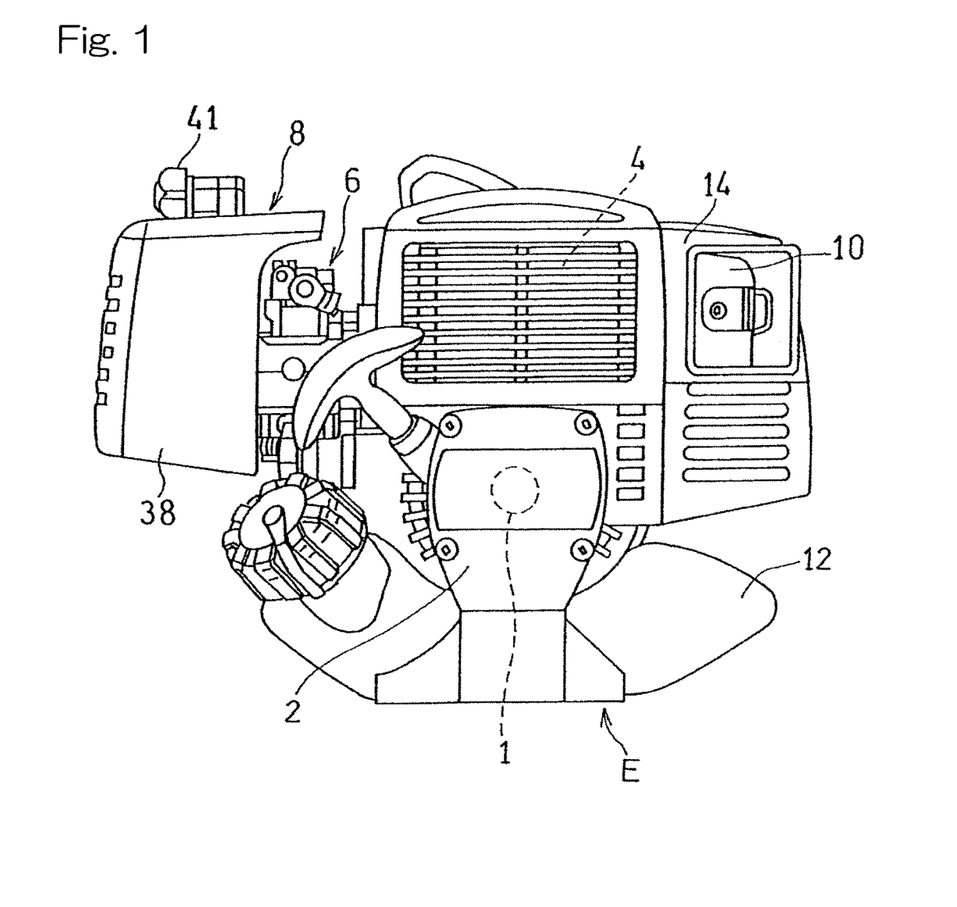
FIG. 1 is a front view of an engine having a structure for suctioning back blow-back fuel according to a first embodiment of the present invention.

FIG. 1 is a front view of the small-sized engine having a structure for suctioning back blow-back fuel according to an embodiment of the present invention. In FIG. 1, the two-cycle engine E includes a crankcase 2 rotatably supporting a crankshaft 1 and a cylinder 4 connected to an upper part of the crankcase 2. A cylinder head is formed so as to be integrated with the cylinder 4. A crank chamber 2a (FIG. 2) is formed in the crankcase 2, and a combustion chamber 4a (FIG. 2) is formed in the cylinder 4.

An air cleaner 8 and a fuel supply device 6, both of which cooperate together to form an air-intake system, are connected to one of left-side and right-side portions (the left side in FIG. 1) of the cylinder 4. A muffler 10 forming an exhaust system is connected to the other one of the left-side and right-side portions (the right side in FIG. 1) of the cylinder 4. In the present embodiment, a carburetor is used as the fuel supply device 6. However, the fuel supply device 6 is not limited thereto, but may be composed of, for example, a fuel injector and a throttle valve located on the upstream side of the fuel injector. The structure of the air cleaner 8 will be described later. A fuel tank 12 is attached to a lower part of the crankcase 2. The cylinder 4 and the muffler 10 are covered by a shroud 14.

Figure 2:
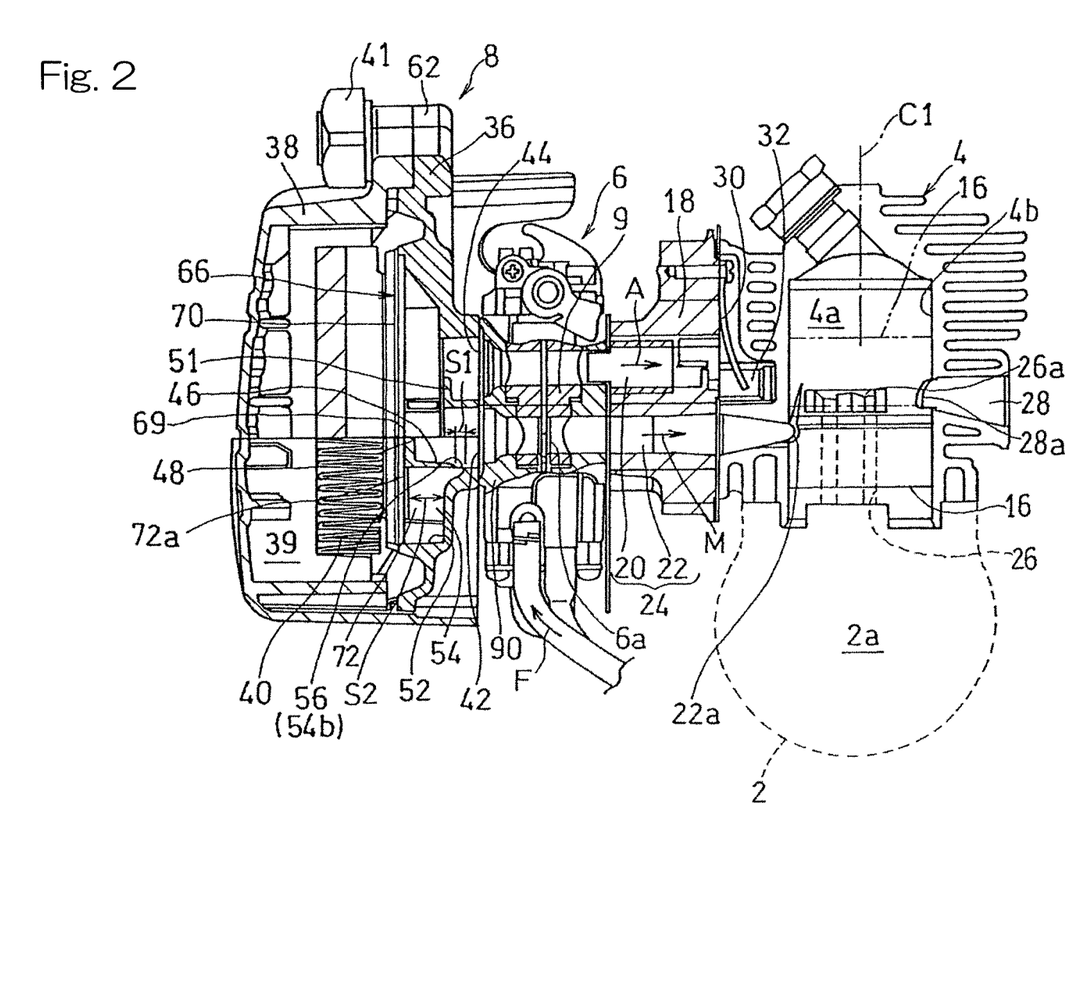
FIG. 2 is a vertical cross-sectional view of an air-intake system of the engine.

As shown in FIG. 2, a cylinder bore 4b is formed in the cylinder 4. A piston 16 which reciprocates in the axial direction C1 (up-down direction) is inserted into the cylinder bore 4b. The combustion chamber 4a is formed by the cylinder bore 4b and the upper surface of the piston 16. An insulator 18 is disposed between the cylinder 4 and the fuel supply device 6. The insulator 18 is made from a thermal insulation material such as resin, and is provided for the purpose of thermal insulation from the cylinder 4 of which the temperature becomes high.

In the air-intake system, an air path 20 and an air-fuel mixture path 22 are formed so as to communicate with the cylinder 4. The air path 20 and the air-fuel mixture path 22 are disposed so as to be parallel to each other such that the air path 20 is located on the upper side and the air-fuel mixture path 22 is located on the lower side. The air path 20 and the air-fuel mixture path 22 cooperate together to form an air-intake passage 24. Each of the air path 20 and the air-fuel mixture path 22 has an upstream-side portion partially located in the carburetor (fuel supply device) 6, and has a downstream-side portion located in the insulator 18. Air A purified by the air cleaner 8 is introduced into the air path 20 and the air-fuel mixture path 22. In the air-fuel mixture path 22 in the fuel supply device 6, the air A is sprayed with fuel F, thereby generating air-fuel mixture M.

A columnar member 9 which rotates about the axis in the up-down direction is disposed in a body 90 of the fuel supply device 6. The air-fuel mixture path 22 is formed in the columnar member 9. The air-fuel mixture path 22 is provided with a throttle valve 6a having a needle that moves upward/downward, and the supply amount of air-fuel mixture M is adjusted by the throttle valve 6a.

The air-fuel mixture path 22 leads to an air-intake port 22a which is opened in the inner circumferential surface of the cylinder 4. Scavenging ports 26a are formed in the circumferential wall of the cylinder 4 such that air-fuel mixture M from the scavenging ports 26a is introduced through scavenging passages 26 into the crank chamber 2a. An exhaust port 28a of an exhaust passage 28 is opened in the inner circumferential surface of the cylinder 4. The exhaust port 28a is formed in the cylinder bore 4b at the circumferential wall of the cylinder 4 so as to be located on a side opposite to the air-intake port 22a such that the axial direction C1 extends between the exhaust port 28a and the air-intake port 22a. Exhaust gas (combustion gas) from the exhaust passage 28 is discharged through the muffler 10 (FIG. 1) to the outside.

A reed valve 30 is attached to the insulator 18 at the downstream-side exit of the air path 20. The reed valve 30 closes the air path 20 when the pressure of air from a communication passage 32 contiguous or fluidly connected with the air path 20 increases to be equal to or greater than a predetermined value. That is, air A from the air path 20 is introduced through the communication passage 32 to upper parts of the scavenging passages 26 when the reed valve 30 is opened.

The following actions are made in an intake stroke that involves the upward movement of the piston 16 to the position that is indicated by a double dotted line in FIG. 2: air-fuel mixture M from the air-fuel mixture path 22 is directly introduced from the air-intake port 22a into the crank chamber 2a by receiving negative pressure generated in the crank chamber 2a, and meanwhile, air A from the air path 20 is temporarily introduced from the communication passage 32 into the upper parts of the scavenging passages 26 by receiving negative pressure generated in the crank chamber 2a.

Then, the following actions are made in a scavenging stroke that involves the downward movement of the piston 16 to the position that is indicated by a solid line in FIG. 2: the air-fuel mixture M introduced into the crank chamber 2a is spurted out from the scavenging passages 26 through the scavenging ports 26a into the combustion chamber 4a, and at this time, the air A having been stored in the upper parts of the scavenging passages 26 is spurted out into the combustion chamber 4a so as to precede the air-fuel mixture M. As described above, the engine E in the present embodiment has a scavenging structure of an air leading type.

The structure of the air cleaner 8 will be described. The air cleaner 8 includes a cleaner case 36 connected to the body 90 of the fuel supply device 6, and a cleaner cap 38 attached to the cleaner case 36. The air cleaner 8 is attached to the insulator 18 together with the fuel supply device 6 by means of common fastening members (not shown) such as bolts.

The cleaner case 36 and the cleaner cap 38 in the present embodiment are molded products made from resin. The cleaner case 36 is substantially rectangular, as seen in the left-right direction. The cleaner cap 38 is formed in a bowl shape having an opening on the cleaner case 36 side. However, the materials and the shapes of the cleaner case 36 and the cleaner cap 38 are not limited thereto. The cleaner case 36 and the cleaner cap 38 form therein an air cleaner chamber 39.

A filter element 40 is disposed in the air cleaner chamber 39. The filter element 40 is made from, for example, paper and filters and purifies air. That is, air introduced from an air inlet (not shown) formed in the gap between the cleaner case 36 and the cleaner cap 38 passes through the filter element 40, and then, is supplied to the fuel supply device 6. In the present embodiment, the cleaner cap 38 covers the cleaner case 36 and the filter element 40.

In the cleaner case 36, a first cleaner exit 42 and a second cleaner exit 44 are disposed so as to be aligned in the up-down direction. Specifically, the second cleaner exit 44 is disposed above the first cleaner exit 42. The first cleaner exit 42 communicates with the air-fuel mixture path 22. The second cleaner exit 44 communicates with the air path 20. That is, the first and second cleaner exits 42 and 44 serve as inlets of the air-intake passage 24.

A first fuel storage portion 46 is formed on the cleaner case 36 so as to be contiguous with the air-fuel mixture path 22. That is, the first fuel storage portion 46 is disposed on the upstream side of the fuel supply device 6 and contiguous or fluidly connected with the air-fuel mixture path 22 of the fuel supply device 6. Specifically, the first fuel storage portion 46 projects upstream from the first cleaner exit 42 of the cleaner case 36. In the present embodiment, the first fuel storage portion 46 is molded so as to be integrated with the cleaner case 36.

Figure 5:
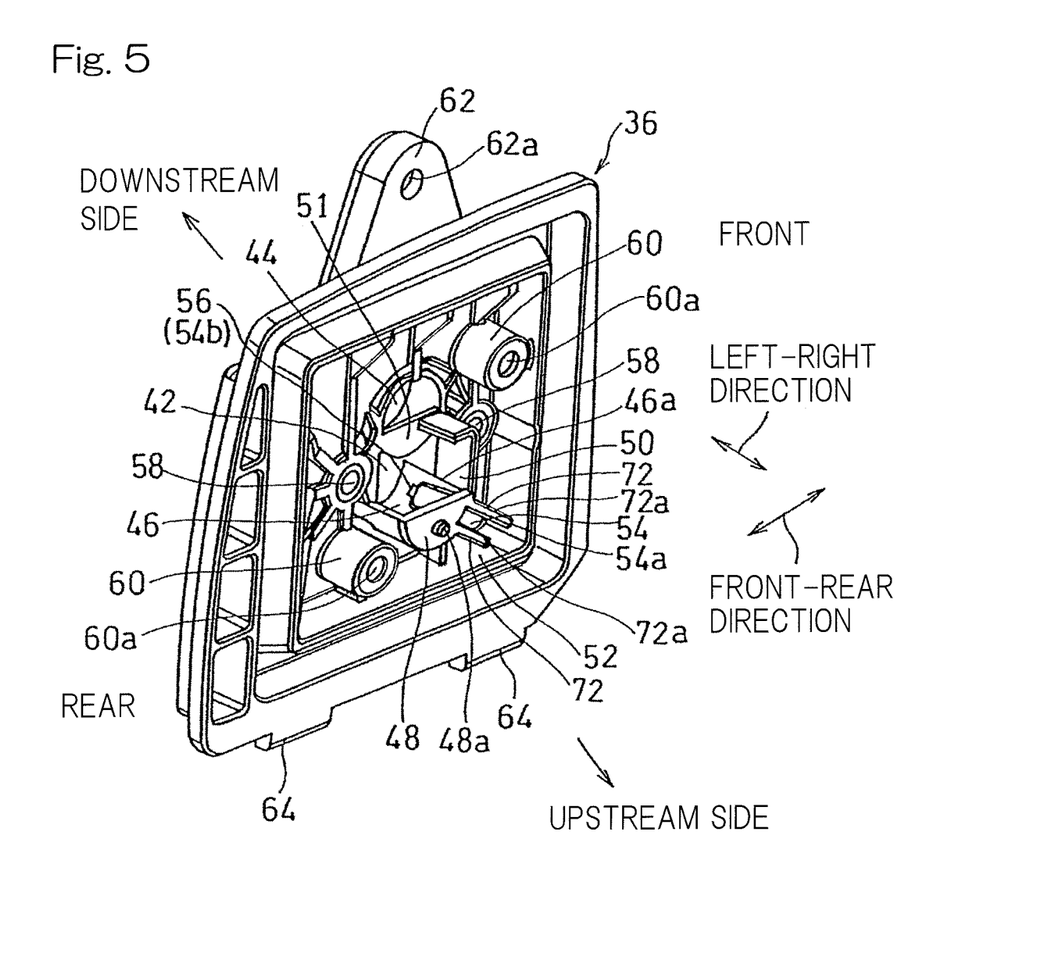
FIG. 5 is a perspective view of the cleaner case.

As shown in FIG. 5, the first fuel storage portion 46 has a semicircular cross-sectional shape that is opened upward. A portion of blow-back fuel is stored in a semicircular recessed portion of the first fuel storage portion 46. A blow-back prevention piece 48 is formed so as to be contiguous with the upstream-side end of the first fuel storage portion 46. The blow-back prevention piece 48 prevents fuel from blowing back from the air-fuel mixture path 22. The blow-back prevention piece 48 is opposed to the first cleaner exit 42 so as to extend substantially orthogonal to the direction of a passage that leads to the first cleaner exit 42. The blow-back prevention piece 48 is also molded so as to be integrated with the cleaner case 36. A positioning projection 48a is formed on the upstream-side end surface of the blow-back prevention piece 48.

A second fuel storage portion 50 is formed on the cleaner case 36. A portion of the blow-back fuel from the air-intake passage 24 is stored also in the second fuel storage portion 50. The second fuel storage portion 50 extends along a part of the peripheral edge of the first cleaner exit 42. In the present embodiment, the second fuel storage portion 50 extends along a front part (near-side part in FIG. 1) of the peripheral edge of the first cleaner exit 42. Therefore, when the orientation of the engine is changed such that the front side thereof in FIG. 5 is tilted downward, blow-back fuel is stored in the second fuel storage portion 50. The second fuel storage portion 50 is contiguous with a side edge 46a, of the first fuel storage portion 46, that extends along the direction of the flow of intake air.

That is, the second fuel storage portion 50 extends, from the front edge of the first cleaner exit 42, upstream in the direction of the flow of intake air, and extends upward from the side edge 46a of the first fuel storage portion 46. An upper end portion of the second fuel storage portion 50 is folded rearward so as to be connected to an entry prevention piece 51 which covers a lower half portion of the second cleaner exit 44. The entry prevention piece 51 prevents blow-back fuel from the first cleaner exit 42 from entering the air path 20 (FIG. 2) through the second cleaner exit 44. In the present embodiment, the second fuel storage portion 50 is molded so as to be integrated with the cleaner case 36. However, the second fuel storage portion 50 does not have to be provided.

A fuel accumulation portion 52 is formed in the air cleaner 8 so as to be located at a bottom portion of the cleaner case 36. The remaining portion of the blow-back fuel from the air-intake passage 24 is accumulated in the fuel accumulation portion 52. In the present embodiment, a step surface provided to the bottom portion of the cleaner case 36 so as to extend in the horizontal direction defines the fuel accumulation portion 52.

A suction-back passage 54 is formed on the cleaner case 36. The suction-back passage 54 is a passage through which fuel accumulated in the fuel accumulation portion 52 in the air cleaner 8 is suctioned back into the air-fuel mixture path 22 (air-intake passage 24) in FIG. 2. In the present embodiment, the suction-back passage 54 allows communication between the fuel accumulation portion 52 and the first fuel storage portion 46. Specifically, a suction-back port 56 is formed in a downstream-side portion of the first fuel storage portion 46, and the suction-back passage 54 allows communication between the fuel accumulation portion 52 and the suction-back port 56. That is, an inlet 54a of the suction-back passage 54 is formed in the fuel accumulation portion 52, and the suction-back port 56 which is an exit 54b of the suction-back passage 54 is formed in the first fuel storage portion 46.

However, the suction-back port 56 only has to be formed in the first fuel storage portion 46, and the location of the suction-back port 56 is not limited to the downstream-side portion of the first fuel storage portion 46. In the case where the second fuel storage portion 50 is provided as in the present embodiment, the suction-back port 56 may be formed in the side edge 46a, of the first fuel storage portion 46, which is contiguous with the second fuel storage portion 50. The structure of the suction-back passage 54 will be described in detail later.

Figure 4:
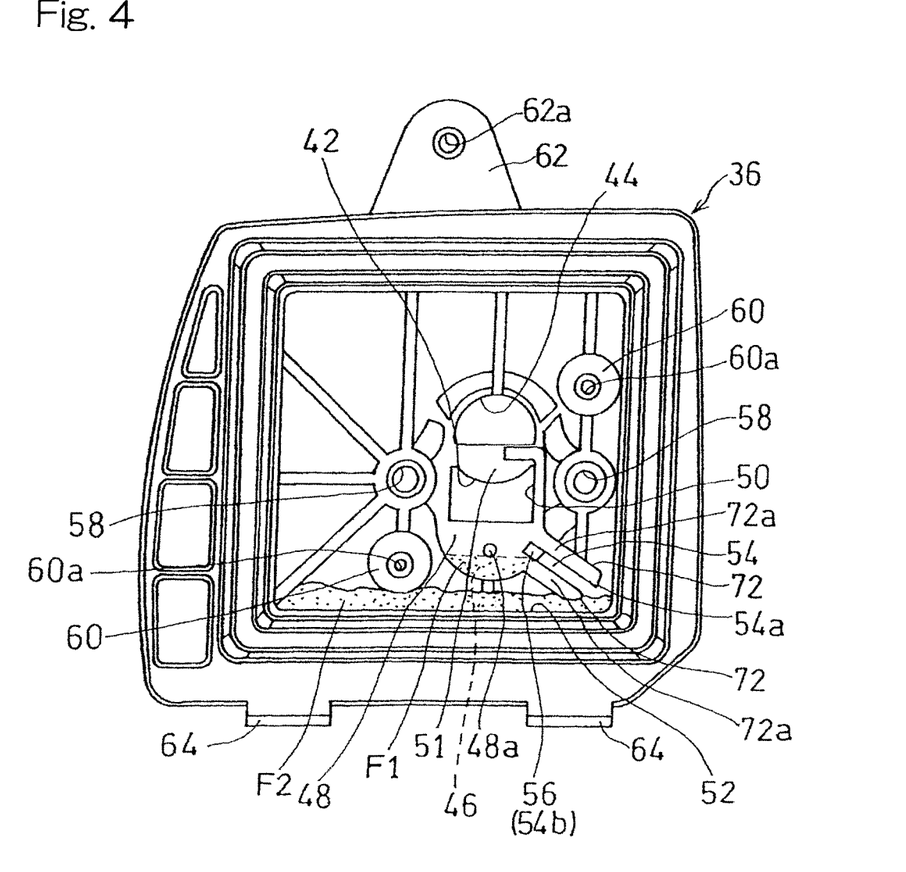
FIG. 4 is a side view of the cleaner case in FIG. 3 from which a blow-back suppression plate is detached.

As shown in FIG. 4, two screw insertion holes 58 and 58 are formed in, and two columnar bosses 60 and 60 are formed on, the inner surface (a surface that faces upstream) of the cleaner case 36. The two screw insertion holes 58 are formed on both sides of the first cleaner exit 42. In the present embodiment, the cleaner case 36 is attached to the insulator 18 together with the fuel supply device 6 shown in FIG. 2 by means of fastening members (not shown) such as bolts inserted into the screw insertion holes 58.

The two bosses 60 are disposed diagonally upward and diagonally downward of the first cleaner exit 42 such that the first cleaner exit 42 is interposed between the two bosses 60. That is, one of the bosses 60 is disposed above one of the screw insertion holes 58, and the other boss 60 is disposed below the other screw insertion hole 58. A screw hole 60a is formed in each boss 60. In the present embodiment, the bosses 60 are molded so as to be integrated with the cleaner case 36.

An attachment piece 62 is formed at the upper end of the cleaner case 36. A screw hole 62a is formed in the attachment piece 62. On the other hand, engaging pieces 64 are formed at the lower end of the cleaner case 36. Specifically, two engaging pieces 64 are arranged side by side at the lower end of the cleaner case 36. The cleaner cap 38 is attached to the cleaner case 36 by the engaging pieces 64 engaging with to-be-engaged portions (not shown) of the cleaner cap 38 shown in FIG. 2 and by an attachment screw 41 being screwed into the screw hole 62a of the attachment piece 62. However, the structure for attaching the cleaner case 36 and the cleaner cap 38 to each other is not limited thereto.

Figure 3:
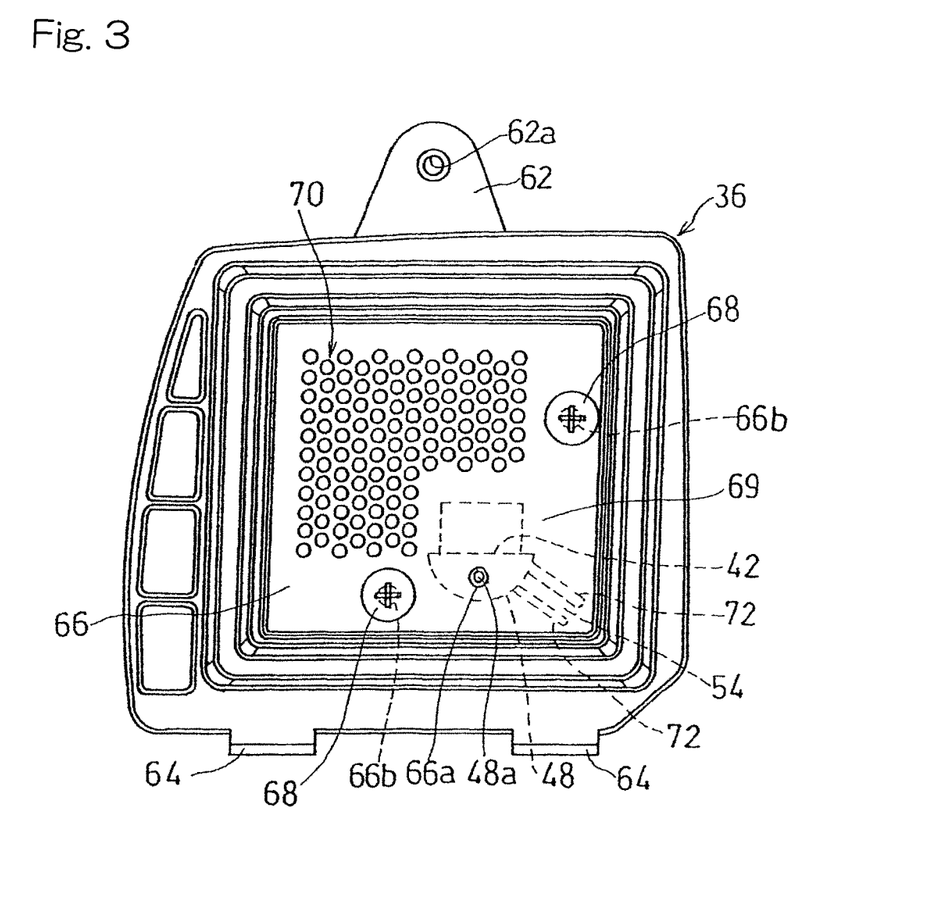
FIG. 3 is a side view of a cleaner case of the engine, as seen from the upstream side in the direction of the flow of intake air.

A blow-back suppression plate 66 shown in FIG. 3 is disposed in the air cleaner chamber 39 of the air cleaner 8. Specifically, the blow-back suppression plate 66 is disposed between the filter element 40 and the first fuel storage portion 46 shown in FIG. 2. The blow-back suppression plate 66 suppresses blow-back of fuel from the air-intake passage 24. The blow-back suppression plate 66 is in contact with the upstream-side end surface of the blow-back prevention piece 48 of the first fuel storage portion 46. On the other hand, a gap is formed between the blow-back suppression plate 66 and the filter element 40.

As shown in FIG. 3, the blow-back suppression plate 66 in the present embodiment is a rectangular plate made of metal. However, the material and the shape of the blow-back suppression plate 66 are not limited thereto. One pin insertion hole 66a and two screw insertion holes 66b and 66b are formed in the blow-back suppression plate 66. In a state where the positioning projection 48a of the cleaner case 36 shown in FIG. 5 is inserted in the pin insertion hole 66a, screws 68 shown in FIG. 3 are inserted into the screw insertion holes 66b and fastened into the screw holes 60a (FIG. 4) of the cleaner case 36. Accordingly, the blow-back suppression plate 66 is detachably fastened to the cleaner case 36.

The blow-back suppression plate 66 includes a blow-back suppression portion 69 having no hole, and an air-intake passage portion 70 through which intake air is allowed to pass. The blow-back suppression portion 69 is opposed to the first cleaner exit 42 in the direction of the flow of intake air. That is, the blow-back suppression portion 69 covers the inlet of the air-intake passage 24, thereby suppressing blow-back of fuel from the air-intake passage 24.

The air-intake passage portion 70 allows communication between the upstream side and the downstream side of the blow-back suppression plate 66 such that intake air passes through the air-intake passage portion 70. In the present embodiment, the blow-back suppression plate 66 partitions the air cleaner chamber 39 (FIG. 2) into the upstream-side and the downstream-side. The air-intake passage portion 70 allows communication between the upstream-side and the downstream-side. In the present embodiment, the air-intake passage portion 70 is implemented by a plurality of punched holes. However, the air-intake passage portion 70 is not limited to the punched holes. As shown in FIG. 2, the fuel accumulation portion 52 is formed at the lower part in the cleaner case 36 so as to be located between the cleaner case 36 and the blow-back suppression plate 66.

The suction-back passage 54 will be described in detail. As shown in FIG. 4, a pair of projecting walls 72 and 72 are formed on the cleaner case 36 so as to project from the cleaner case 36. The projecting walls 72 are molded so as to be integrated with the cleaner case 36. The height of each projecting wall 72 is equal to the amount of projection of the first fuel storage portion 46 from the cleaner case 36. That is, the blow-back suppression plate 66 is in contact with the projecting ends 72a of the projecting walls 72 and 72 when attached to the cleaner case 36. In other words, a lower part of the blow-back suppression plate 66 serves as a closing member that is in contact with the projecting ends 72a of the projecting walls 72 and 72. However, a closing member may be separately provided instead of the blow-back suppression plate 66.

The suction-back passage 54 is surrounded by the cleaner case 36, the pair of projecting walls 72 and 72, and the lower part of the blow-back suppression plate 66, and thus the outer periphery of the suction-back passage 54 is closed. That is, the suction-back passage 54 is formed as a passage having a rectangular cross-sectional shape and a closed outer periphery. In the present embodiment, the area S1 of the suction-back port 56 shown in FIG. 2 is set to be smaller than the cross-sectional area S2 of the suction-back passage 54. The ratio (S1/S2) of the area S1 relative to the cross-sectional area S2 is preferably 0.1 to 0.5, and is about 0.2 in the present embodiment.

Figure 6:
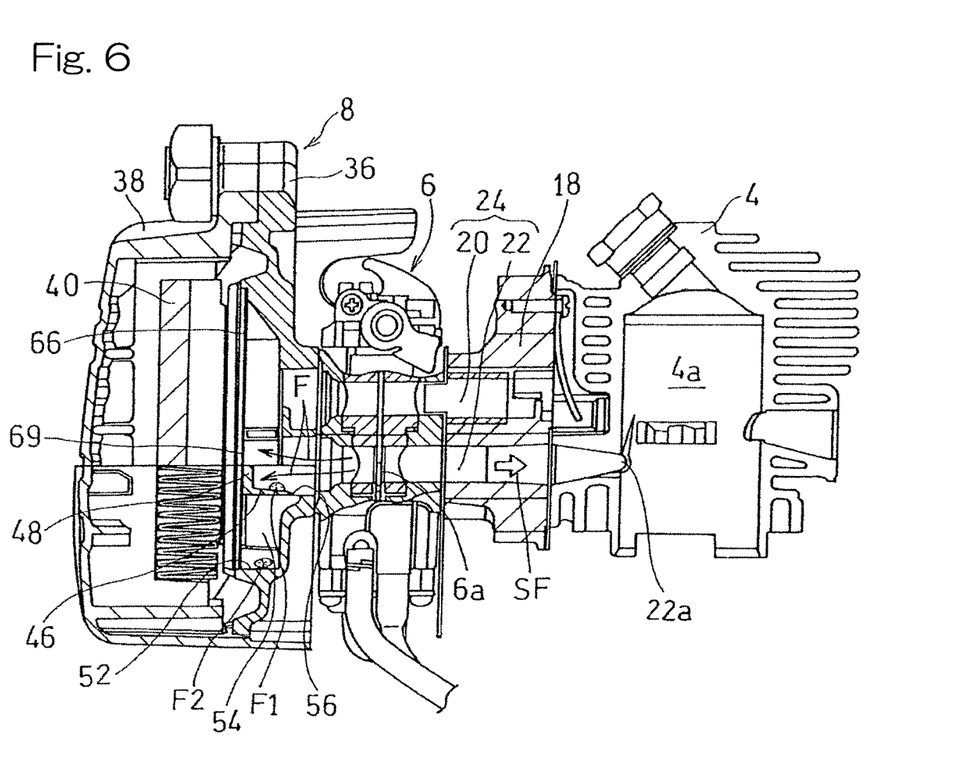
FIG. 6 is a vertical cross-sectional view of the structure for suctioning back blow-back fuel.

Operations in the structure for suctioning back blow-back fuel according to the present embodiment will be described with reference to FIG. 6. Fuel may blow back from the fuel supply device 6 into the air cleaner 8 as indicated by arrow F owing to pulsation that is caused by actions of the throttle valve 6a and the air-intake port 22a of the cylinder 4, especially when the engine is operated at high speed. Such blow-back fuel impacts, and is received by, the blow-back prevention piece 48 and the blow-back suppression portion 69 of the blow-back suppression plate 66. A portion F1 of the blow-back fuel received by the blow-back prevention piece 48 and the blow-back suppression plate 66 is accumulated in the first fuel storage portion 46. The blow-back fuel F1 accumulated in the first fuel storage portion 46 is suctioned back into the air-intake passage 24 contiguous with the first fuel storage portion 46 by suction force SF generated by the intake air flowing in the air-intake passage 24.

The remaining portion F2 of the blow-back fuel received by the blow-back prevention piece 48 and the blow-back suppression plate 66 is accumulated in the fuel accumulation portion 52. The blow-back fuel F2 accumulated in the fuel accumulation portion 52 is suctioned back from the suction-back passage 54 through the suction-back port 56 into the air-intake passage 24 by the suction force SF of the flow of intake air.

In the above-described configuration, since blow-back fuel is received by the blow-back suppression plate 66 and the blow-back prevention piece 48, adhesion of the blow-back fuel to the filter element 40 or the inner surface of the cleaner cap 38 is suppressed. In addition, the fuel F1 accumulated in the first fuel storage portion 46 is suctioned back into the air-intake passage 24. The blow-back fuel F2 having dropped from the first fuel storage portion 46 and accumulated in the fuel accumulation portion 52 at the bottom portion of the cleaner case 36, is suctioned back from the suction-back passage 54 and the suction-back port 56 into the air-intake passage 24. Accordingly, the blow-back fuel F2 can be inhibited from being accumulated in the cleaner case 36.

Since the suction-back port 56 is formed in the downstream-side portion of the first fuel storage portion 46, the suction effect of the flow of intake air in the air-fuel mixture path 22 is favorably obtained. Accordingly, the blow-back fuel F2 accumulated in the fuel accumulation portion 52 can be effectively suctioned back into the air-intake passage 24. As described above, the above-described configuration enables the blow-back suppression plate 66 and the blow-back prevention piece 48 to suppress scattering of blow-back fuel F1, and enables the blow-back fuel F1 to be effectively suctioned back from the first fuel storage portion 46 and the suction-back port 56 into the air-intake passage 24 owing to the suction effect of the flow of intake air.

Furthermore, the suction-back passage 54 is a passage having a closed outer periphery as a result of being surrounded by the cleaner case 36, the pair of projecting walls 72 and 72, and the blow-back suppression plate 66. Since the suction-back passage 54 is formed so as to have a closed outer periphery, suction force SF generated by intake negative pressure can be effectively made use of. In addition, the blow-back suppression plate 66 is used as a part of the wall of the suction-back passage 54. Accordingly, it is not necessary to provide any separate member, whereby the number of components can be reduced.

Moreover, the area S1 of the suction-back port 56 is set to be smaller than the cross-sectional area S2 of the suction-back passage 54. Accordingly, the suction effect due to intake air comes to be easily exerted in the suction-back passage 54. As a result, the blow-back fuel F2 accumulated in the fuel accumulation portion 52 can be effectively suctioned back into the air-intake passage 24 owing to the suction force SF of the flow of intake air.

The blow-back suppression plate 66 is detachably fasten to the cleaner case 36. Therefore, the blow-back suppression plate 66 can be easily detached from the cleaner case 36, and thus the inside of the air cleaner 8 can be easily cleaned.

The fuel accumulation portion 52 is formed at the lower part in the cleaner case 36 so as to be located between the cleaner case 36 and the blow-back suppression plate 66. The inlet 54a of the suction-back passage 54 is formed in the fuel accumulation portion 52. Since the fuel accumulation portion 52 is formed in such a narrow space, the blow-back fuel F2 in the fuel accumulation portion 52 can be smoothly suctioned back into the air-intake passage 24.

As shown in FIG. 5, the second fuel storage portion 50 is disposed on the cleaner case 36. Accordingly, the blow-back fuel F1 can be stored in the second fuel storage portion 50 even when the orientation of the engine is changed. The present embodiment employs a configuration in which the blow-back fuel F1 is accumulated in the second fuel storage portion 50 when work is performed with a work tool (cutting blades in the case of a brush cutter) being tilted upward. The blow-back fuel F1 stored in the second fuel storage portion 50 is suctioned back into the air-intake passage 24 owing to the suction effect. In the case where the second fuel storage portion 50 is provided, the suction-back port 56 is preferably disposed in the vicinity of the boundary between the first and second fuel storage portions 46 and 50.

As shown in FIG. 2, the fuel supply device 6 in the present embodiment is a carburetor, and the suction-back port 56 communicates with the air-fuel mixture path 22 on the lower side of the carburetor. Accordingly, the structure for suctioning back blow-back fuel according to the present invention is applicable also to a scavenging structure of an air leading type.

The present invention is not limited to the above-described embodiment, and various additions, changes, or deletions can be made without departing from the gist of the present invention. Although the air-intake passage 24 includes the air path 20 and the air-fuel mixture path 22 in the above-described embodiment, the air path does not have to be provided. In addition, the blow-back prevention piece 48 does not have to be provided. In this case, the upstream-side end surface of the first fuel storage portion 46 is in contact with the blow-back suppression plate 66. Accordingly, these are to be construed as included in the scope of the present invention.

REFERENCE NUMERALS

6 . . . fuel supply device (carburetor)
8 . . . air cleaner
20 . . . air path
22 . . . air-fuel mixture path
24 . . . air-intake passage
36 . . . cleaner case
38 . . . cleaner cap
40 . . . filter element
42 . . . first cleaner exit (inlet of air-intake passage)
46 . . . first fuel storage portion
48 . . . blow-back prevention piece
50 . . . second fuel storage portion
52 . . . fuel accumulation portion
54 . . . suction-back passage
54 . . . inlet of suction-back passage
56 . . . suction-back port
66 . . . blow-back suppression plate (closing member)
69 . . . blow-back suppression portion
70 . . . air-intake passage portion
72 . . . projecting wall

What is claimed is:

1. A structure for suctioning back blow-back fuel, the structure comprising:
   a first fuel storage vessel disposed on an upstream side of a carburetor of an engine and contiguous with an air-intake passage of the carburetor;
   a suction-back passage through which fuel accumulated in an air cleaner is suctioned back into the air-intake passage; and
   a blow-back suppression plate disposed between a filter element of the air cleaner and the first fuel storage vessel and configured to suppress blow-back from the air-intake passage, wherein
   the suction-back passage allows communication between a fuel accumulation container in the air cleaner and a suction-back port formed in the first fuel storage vessel,
   the air cleaner includes a cleaner case connected to the carburetor, and a cleaner cap covering the cleaner case and the filter element, and
   the suction-back passage is formed by:
      the cleaner case;
      a pair of projecting walls formed so as to be integrated with the cleaner case; and
      the blow back suppression plate which is in contact with tip ends of the pair of projecting walls.

2. The structure for suctioning back blow-back fuel as claimed in claim 1, further comprising
   a blow-back prevention wall formed at an upstream-side end of the first fuel storage vessel, the blow-back prevention wall being opposed to an inlet of the air-intake passage and configured to prevent blow-back from the air-intake passage.

3. The structure for suctioning back blow-back fuel as claimed in claim 1, wherein
   the blow-back suppression plate is attached to the cleaner case.

4. The structure for suctioning back blow-back fuel as claimed in claim 1, wherein
   an area of the suction-back port is set to be sufficiently smaller than a cross-sectional area of the suction-back passage such that a suction effect due to intake air flowing in the air-intake passage is exerted.

5. The structure for suctioning back blow-back fuel as claimed in claim 1, wherein
   the blow-back suppression plate includes:
      a blow-back suppression surface configured to suppress the blow-back; and
      a portion of the air-intake passage through which intake air is allowed to pass, and
   the blow-back suppression plate is configured to cover an inlet of the air-intake passage and be detachably fastened to the cleaner case.

6. The structure for suctioning back blow-back fuel as claimed in claim 1, wherein
   the fuel accumulation container is formed at a lower part in the cleaner case so as to be located between the cleaner case and the blow-back suppression plate, and
   an inlet of the suction-back passage is formed in the fuel accumulation container.

7. The structure for suctioning back blow-back fuel as claimed in claim 1, wherein
   the first fuel storage vessel projects upstream from an inlet of the air-intake passage, which is formed in the cleaner case,
   a second fuel storage vessel is formed on the cleaner case so as to extend along a part of a peripheral edge of the inlet of the air-intake passage, and
   the second fuel storage vessel is contiguous with a side edge of the first fuel storage vessel, that extends along a direction of a flow of intake air.

8. The structure for suctioning back blow-back fuel as claimed in claim 1, wherein
   the carburetor includes an air path and an air-fuel mixture path, and the suction-back port communicates with the air-fuel mixture path.

* * * * *